(12) United States Patent  
Wenneman et al.

(10) Patent No.: US 8,781,716 B1  
(45) Date of Patent: Jul. 15, 2014

(54) PREDICTIVE TRAVEL NOTIFICATIONS

(71) Applicants: Michael Christopher Wenneman, Seattle, WA (US); Samuel S. Gigliotti, Seattle, WA (US)

(72) Inventors: Michael Christopher Wenneman, Seattle, WA (US); Samuel S. Gigliotti, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/622,162

(22) Filed: Sep. 18, 2012

(51) Int. Cl.
   *G06F 19/00* (2011.01)
   *G01C 21/34* (2006.01)
   *G08G 1/00* (2006.01)

(52) U.S. Cl.
   CPC . *G08G 1/00* (2013.01); *G01C 21/34* (2013.01)
   USPC ......................................... 701/118

(58) Field of Classification Search
   USPC .......................................... 701/118
   See application file for complete search history.

(56) References Cited

U.S. PATENT DOCUMENTS

| | | | |
|---|---|---|---|
| 7,908,080 B2* | 3/2011 | Rowley et al. | 701/423 |
| 2006/0149461 A1* | 7/2006 | Rowley et al. | 701/202 |
| 2009/0005979 A1* | 1/2009 | Nakao et al. | 701/210 |
| 2010/0010733 A1* | 1/2010 | Krumm | 701/201 |
| 2011/0210865 A1* | 9/2011 | Lee et al. | 340/903 |
| 2012/0265433 A1* | 10/2012 | Viola et al. | 701/410 |

* cited by examiner

*Primary Examiner* — Mary Cheung  
*Assistant Examiner* — Anne Mazzara  
(74) *Attorney, Agent, or Firm* — Novak Druce Connolly Bove + Quigg LLP

(57) ABSTRACT

Various embodiments can predict a user's intended driving route in order to provide the user with traffic warnings for traffic conditions along the same. A user's driving route, in at least one embodiment, is predicted by collecting travel data, such as information associated with the date, time, location, and direction for trips made within a network of roads over time. Instead of keeping the travel data anonymous, the travel data is associate or linked to the user's account or stored in a user profile in order to build a history of travel patterns for the user over time. The travel patterns can then be used to predict when a user is going to travel or make a trip and, upon identifying a context indicative of a travel pattern, traffic information for a route associated with the pattern is obtained and provided to the user's computing device.

25 Claims, 7 Drawing Sheets

PREDICTIVE TRAVEL NOTIFICATIONS

BACKGROUND

Many people utilize computer-based mapping applications to obtain the locations of, and directions to, various locations, as well as to locate places near a current or specific location. A person wanting to perform such a task typically opens an application, inputs the necessary information (such as a location or point of interest) and receives location information, driving directions, nearby points of interest as determined by the mapping application provider, and other such information. Conventional Global Positioning System (GPS) enabled devices can collect information associated with user traveling within a network of roads. Typically, this information is anonymously and impersonally collected and aggregated to build various traffic models. These traffic models are then used by turn-by-turn (TBT) navigation routing algorithms to assist drivers in traffic jams. However, since most drivers are typically driving along well known or familiar routes (e.g., driving to and from work, taking kids to school, driving to a friend's house, etc.), they do not typically use TBT on a regular basis nor refer to a computing device prior to traveling. Thus, as technology advances and as people are increasingly using portable computing devices in a wider variety of ways, it can be advantageous to adapt the ways in which traffic information is collected, aggregated, and presented to users.

BRIEF DESCRIPTION OF THE DRAWINGS

Various embodiments in accordance with the present disclosure will be described with reference to the drawings, in which.

DETAILED DESCRIPTION

Figure 1:
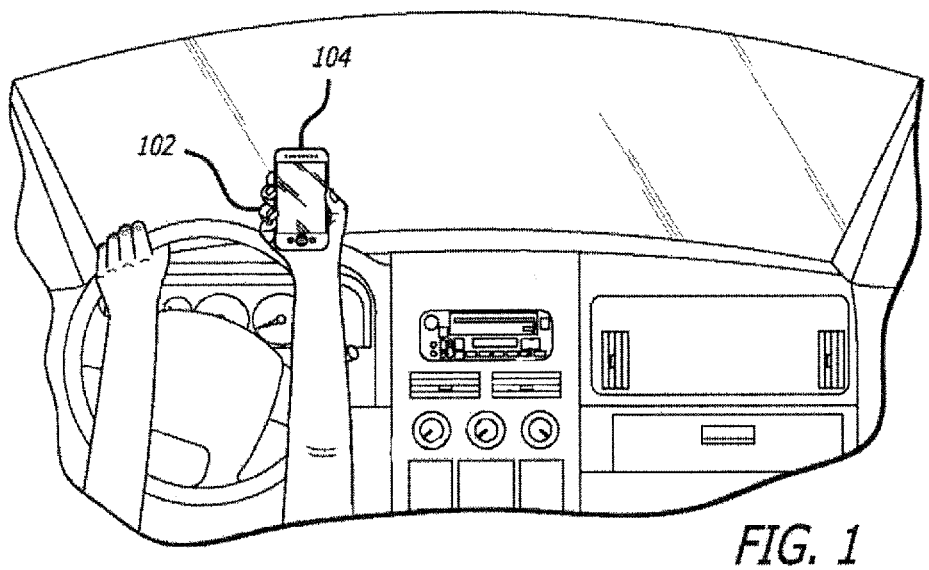
FIG. 1 illustrates an example situation where a user is accessing traffic information on a portable computing device in accordance with at least one embodiment.

Systems and methods in accordance with various embodiments of the present disclosure may overcome one or more of the aforementioned and other deficiencies experienced in conventional approaches to managing content delivery and/or functionality on a portable computing device. In particular, various embodiments can attempt to predict a user's intended driving route in order to provide the user with notifications, alerts, or warnings of traffic conditions or events along the route. Attempts are made to predict or anticipate a user's driving route, in various embodiments, by collecting travel or location data, such as information associated with the date, time, latitude/longitude coordinates, direction, and speed for trips made within a network of roads over time in order to learn a user's travel patterns. The travel patterns include a user's geographic movement habits, such as where a user travels at particular times of day or days of the week, favorite routes a user typically takes to a destination even when a favorite route may not necessarily be the fastest route to the destination, and the like. Instead of keeping the collected travel data anonymous, as with certain conventional traffic monitoring systems, the travel data can be associated or linked to the user's account or stored in a user profile in order to build a set of travel patterns for the user over time. The travel patterns can then be used to attempt to predict when a user is going to travel or make a trip, such as what time a user leaves for work in the morning or leaves work in the evening, before the user actually embarks along a route associated with a particular pattern. For example, based on historical patterns a system can predict with a fair degree of certainty that a user will leave work around 5:30 pm. At 5:00 pm the system can check traffic along the user's normal route home and warn the user before leaving if there is an issue, such as an accident or road construction, that is causing traffic congestion. In this example, a map overlay including real-time traffic conditions can be provided to assist in rerouting the user on their way home. In order to reroute the user, a system can determine an optimal route by using current and historic traffic data to calculate travel times based at least in part on the flow of traffic when plotting a route, when multiple plausible routes are available. Often traveled routes can additionally be surfaced to users for annotation, labeling, and saving particular routes as favorites.

Accordingly, at least one service in accordance with various embodiments can monitor a user's habits and location through at least one computing device associated with the user. A user subscribed to such a service can have at least one portable computing device that includes a location determining capability (e.g., GPS, GLONASS, EGNOS, Wi-Fi triangulation, etc.) and is at least periodically in communication with at least one computer system or network of the service. In various embodiments, the portable computing device will regularly send the computer system data associated the user's location. In response to receiving data associated with the user's location, the computer system can determine information relevant to the user based on the user's current geographic location and/or habits. This information can include suggestions for locations or businesses along a route that may be of interest to the user based on historical movements. The information may also include coupons or product promotions to entice the user to return to a familiar business.

Various other functions and advantages are described and suggested below as may be provided in accordance with the various embodiments.

FIG. 1 illustrates an example situation 100 wherein a user 104 is provided with traffic information from a portable computing device 102 while being transported in a vehicle. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, and portable media players, among others. As mentioned above, various embodiments described herein provide the user 104 with real-time traffic notifications, warnings, or alerts to avoid traffic jams. Since people typically follow a fairly well defined set of habits, routines, and/or schedules in their daily lives, their movements can be reasonably predicted. In at least one embodiment, user travel or location data associated with these habits, routines, and/or schedules is collected for routes or paths traveled within a network of roads and/or highways from the computing device 102. The user travel data is typically collected on a continuously basis and can include information associated with the date, time, latitude/longitude coordinates, direction, start and end location, and/or speed of a particular trip, reoccurring driving routine, or commute, such as driving to work each morning. The travel data is then used to build a graph, history, or schedule of identified travel patterns for the user 104, to predict destinations a user may be heading and/or routes a user might take in a particular context or under a particular set of circumstances, which can be identified using a pattern recognition algorithm. In at least one example, the context of the computing device is based, at least in part, on the travel or location data corresponding to current movement of the device. For example, the user's context can refer to a time of day, a day of the week, a location, or a combination thereof under which the user has routinely acted in a particular manner, such as driving to work on a weekday morning, driving kids to school, and the like. Further, data associated with geographic addresses in a user's address book may pulled and used as a factor for predicting a user's intended destination. Since people change jobs, move, or their kids enter different schools, the graph or schedule of travel patterns can be updated over time according to changes in the travel data. The schedule is then used to attempt to predict movement of the user 104 along a route or path on a map associated with an identified travel pattern. Upon identifying movement, conditions, circumstances, or a context indicative of an identified pattern, current traffic conditions for one or more routes to a destination associated with the identified pattern can be checked for traffic events and/or congestion. In at least one embodiment, an alert is provided to the user 104 when traffic congestion along one or more routes associated with the identified pattern is abnormal or likely to impact the user's travel time relative to known or average travel times. In view of the traffic congestion, if the user's travel time is likely impacted and an alternate route indicates a shorter travel time, the notification can suggest an alternate route including turn-by-turn (TBT) navigation, an alternate departure time, or the like. If there is no traffic, or when the current level of traffic is considered normal for that particular time of day, no alert is necessary. However, users, in at least some embodiments, may optionally choose to receive such notifications even when traffic conditions are normal. Further, upon traveling down a route associated with multiple frequented destinations, a user could be presented with a choice of potential, or fuzzy, destinations in order to increase the efficiency of the traffic data presented to the user.

Figure 2:
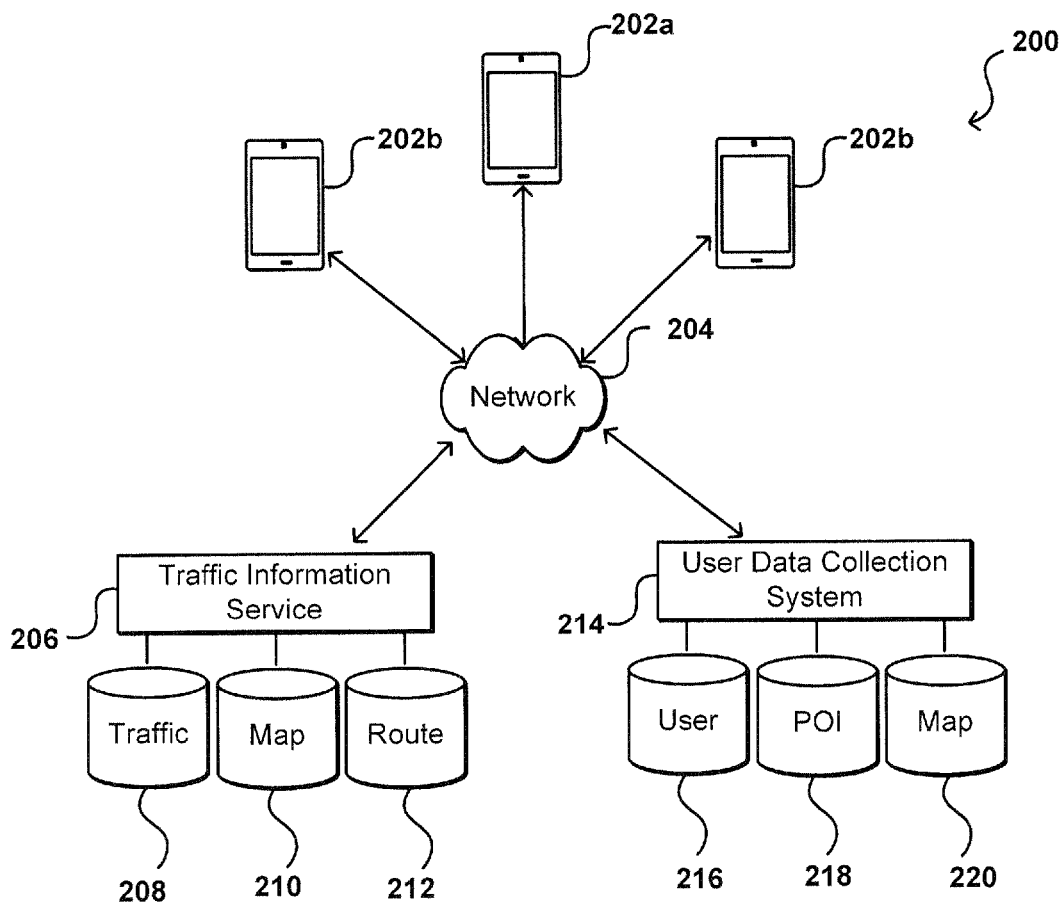
FIG. 2 illustrates an example portion of an environment in which various embodiments can be implemented.

FIG. 2 illustrates an example environment 200 in which a user can obtain substantially real-time traffic information using a client device 202a, in accordance with various embodiments. It should be understood that the example system provides a general overview of basic components and their interaction, and that there can be many additional and/or alternative components or interactions utilized as known or used in the art for the generation, transmission, processing, management, and/or storage of electronic information. In this example, a user data collection system 214 monitors and collects movement, habit, and/or behavior information of a GPS-enabled client device 202a associated with a user over at least one appropriate network 204, such as a cellular network, the Internet, or another such network for communicating digital information. In many cases, the user data collection system 214 will store map data in a map data store 220, or other such location. The map data can include data that correlates a user's position, movements, routes commonly taken to regularly visited destinations with behavior, routines, and schedules associated therewith. The map data stored in the map data store 220 can also include graphical map tiles that show a map view of a region including a network of roads and highways, other area identifying information, and may also include various points of interest (POI) to the user, such as businesses, stores, restaurants, and the like that the user frequents. Data associated with the POI and a user's interaction therewith can be stored in a POI data store 218, or other such location. Additionally, the POI data may also include a default set of POI determined by a provider of the service, or other such entity, for suggesting additional POI or associated promotions based in part on the collected user movement and behavior information. The user data collection system 214 may also include a user data store 216 for storing other data associated with a user's movement, schedule, routine, habits, behaviors, preferences, and/or other such information.

Further, in this example, the user is able to utilize the client device 202a to access a traffic information system or service 206 over the network 204. In some embodiments, a mapping application can be installed on the client device 202a, such that much of the planning, information gathering, or other such aspects associated with both the user data collection system 214 and the traffic information service 206 can be executed on the client device, while the traffic information service 206 is contacted primarily to obtain substantially real-time traffic data. The traffic data can be provided as a map overlay for a particular region stored in a map data store 210, or other such location. Additionally, the traffic information service 206 can also be contacted for route information, such as TBT navigation information and information with respect to alternative routes, stored in route data store 212, or other such location. The traffic information service 206 receives and aggregates the traffic data for current and historic traffic conditions from various sources, such as movement/traffic flow data from a plurality of client devices (202a 202b), road traffic sensors, vehicle-based data sources, and the like and stores this information in a traffic database 208, or other such location. The traffic information service 206 may also use the received data to generate future traffic predictions and can provide the predicted information to the client device 202a and optionally to one or more other recipients, such as one or more vehicle-based clients, and other third-party systems or clients. The traffic information service 206 can additionally use the predicted traffic condition information to generate the information with respect to alternative routes, stored in route data store 212.

In at least one embodiment, the traffic information service 206 receives requests from a client 202 or from the user data collection system 214 for current traffic information related to one or more routes between a start and an end location in a given geographic area. For example, the user data collection system 214 could determine, based in part on information stored in the user data store 216, that the user leaves work at 5:30 pm on weekdays and usually takes a specific route. In this example, user data collection system 214 could request current traffic data from the traffic information service 206 around 5:15 pm. In response, the traffic information service 206 can obtain current and projected traffic conditions for the requested area and provided the same to the client device 202. If there is an accident, road construction, or the like along the user's specific route, the user can be provided with an alert via the client device 202a, which may include information with respect to alternative routes with shorter projected travel times, as described elsewhere herein. In another embodiment, the traffic information service 206 can analyze various route options and select a route based on an indicated criterion, such as shortest time travel time. The determining of routes between two or more locations can be performed on the client device 202, by the traffic information service 206, or a combination thereof. Various other interaction and execution approaches can be utilized as well within the scope of the various embodiments.

Figure 3:
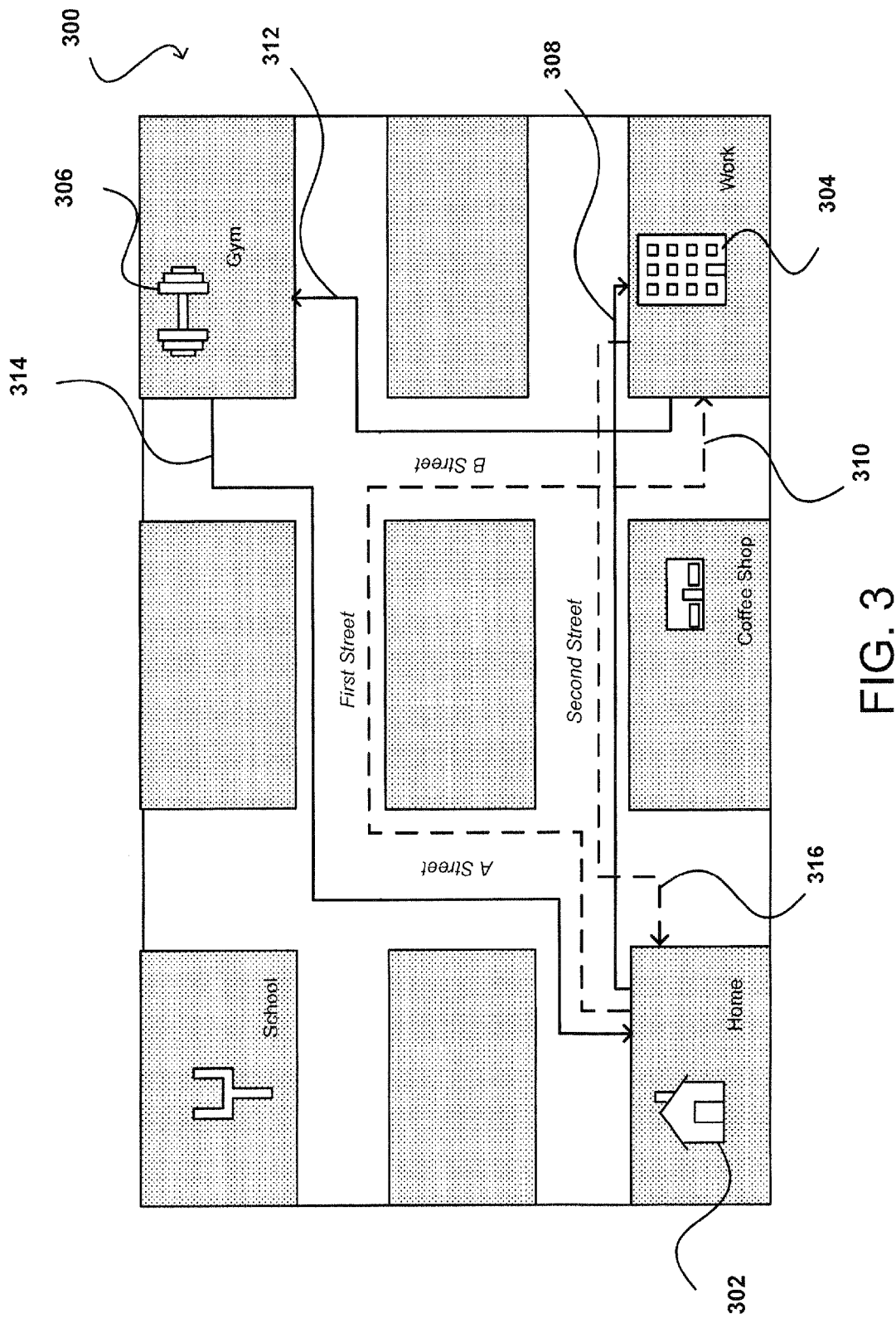
FIG. 3 illustrates an example map illustrating multiple routes in accordance with at least one embodiment.

FIG. 3 illustrates an example map 300 that can be used to track and/or infer user location, movement, travel, and other such information to assist in determining a context for a communication in accordance with various embodiments. It should be understood that devices, applications, and services do not necessarily think in terms of maps, but may think in terms of positions, coordinates, routes, and/or other such information, and maps such as that in FIG. 3 may only be visual representations of a user's location. For purposes of explanation the description will refer to a selection of maps, but it should be understood that such renderings are used for purposes of explanation with respect to various aspects of the described embodiments.

In various embodiments, position, movement, and travel information for a user is monitored over time. One or more algorithms can be executed against the position, movement, and/or travel information in an attempt to recognize patterns or other repeated occurrences in the user's behavior, such as schedules or routines, to assist in determining a context or conditions indicative of travel or movement patterns. For example, the map 300 of FIG. 3 illustrates a map of the streets near a user's home 302 and work 304 that make up much of the user's area of travel or movement. When a user leaves their home, the start of their route will match a plurality of familiar routes or travel patterns. Using historical data along with date and time information, a system or service can predict which route the user is likely to take (e.g., when leaving home on a weekday morning the user is very likely driving to work). In this example, there is an example route 308 that represents the user's normal commute path or default route to work 304 each morning during the week. In this example, based on data collected over a period of time, the computing device (or system in communication therewith) has noted, using a pattern recognition algorithm or the like, the user's habit of taking route 308 from a first point (home 302) to a second point (work 304) around 8:30 am on weekdays. In response to determining a travel pattern (route, day(s), and time), the computing device (or system in communication therewith) can establish a schedule to query a traffic information service for current traffic conditions in advance of a date and time the user typically travels. In this example, the traffic information service could be queried each weekday morning at 8:00 am and a notification or alert can be sent with information regarding any traffic abnormalities to give the user time to make alternate arrangements. For instance, assuming the traffic information system is queried at 8:00 am on a Tuesday as part of a routine weekday query and the query returns information of an accident located on Second Street between A Street and B Street. In this example, the notification can include details of the traffic conditions caused by the accident, such as a travel delay time, flow or average speed information (e.g., a rate of cars that pass a particular point), a map could be displayed representing different degrees or levels of traffic congestion as different colors (green for light traffic, red for heavy traffic, for example). The notification may also suggest an alternate route. The traffic information system could query all traffic data within a region associated with the user's travel pattern and calculate travel times along a plurality of paths or routes between the user's home 302 and work 304 and suggest the fastest route or route with the minimum calculated travel time. The notification may also include turn-by-turn navigation information, which can be presented to the user graphically on a display screen of the computing device, audibly using a computer generated voice, or any other number of ways known in the art. In this example, the notification suggests taking route 310, which is not as direct to the user's destination as route 308, but has a faster calculated travel time relative thereto in view of current traffic flow rates caused by the accident. Thus, in this example, without requiring the user to initiate the query, a traffic notification is sent to the user's computing device before the user leaves for work 304 warning the user of an accident along their normal route 308 and suggests a faster alternative route 310 in view of the accident. Further, based on the collected travel/behavior data, the computing device has recognized a pattern of the user leaving work 304 at 5:30 pm and traveling on route 312 to the gym 306 on weekdays. In this example, the computing device could query the traffic information system at 5:00 pm to check for traffic abnormalities along route 312. Similarly, the user may typically leave the gym 306 around 7:30 pm traveling on route 314 when heading home 302 and traffic abnormalities can be checked and presented in a similar manner as described above.

Determining a travel or behavior pattern is not limited to travel associated with a time component; the pattern could also be associated with a route or destination. For example, the user may go to the gym 306 nine out of ten weekdays, but on each of those weekdays the user does not go to the gym, the user usually heads straight home 302 along route 316. Therefore, in this example, once the user leaves work 304 and is detected not to be heading in the direction of the gym 306, the computing device could assume with a fair degree of certainty that the user is heading straight home 302 and, in response, pull (or be pushed) traffic information for route 316. In another example, the user may only take a certain route when going to the beach and at no other time, but only rarely go to the beach. Upon detecting the user taking or embarking on the route associated with going to the beach, the computing device can check traffic conditions along that route and present traffic abnormalities to the user. Additionally, a system, in accordance with at least some embodiments can pull information from applications in a user's computing device as a queue for pulling traffic data. For example, a user may have certain errands, stops, or events associated with a particular location stored in their calendar, task list, or reminder applications of their computing device, which can be used to plot routes or plot around traffic congestion.

Information regarding locations or businesses the user has visited may also be used to provide targeted communications and suggest additional locations or businesses that may be of interest to the user based on the user's historical movements. The collected information along each route will also likely include stops along the way to a destination, such as coffee shops on the way to work, restaurants, supermarkets, and the like. Based on the map coordinates associated with various stops, the computing device (or system in communication therewith) can determine which establishments the user frequents. This information can be used to suggest additional or related places or points of potential interest, such as additional restaurants, coffee shops, and other businesses either when the user has been rerouted as a result of traffic along a user's normal route or as other suggestions related to points of interest along familiar routes. Discounts, coupons, or other items may also be included in a suggestion. Suggestions may also be interactive and include interface elements such as an element that allows the user to select the elements in order to get directions to the suggested business. Additionally, as part of monitoring the user's habits, the portable computing device in at least some embodiments can log data regarding the information or functionality that the user has accessed, inquired about, clicked on, or provided input to receive additional information or functionality. This information can then be used for purposes such as to infer a user's interest in various items, topics, businesses, subject matter, news alerts, locations, establishments, events, and the like that can be used to make further suggestions. Further, both the consumption history of other users and attributes for businesses may be used together to additionally provide effective real-time location based suggestions. Thus, a system, in accordance with at least some embodiments, can not only assist a user getting from point A to point B more efficiently, but can also suggest useful information along the way to a destination.

Figure 4:
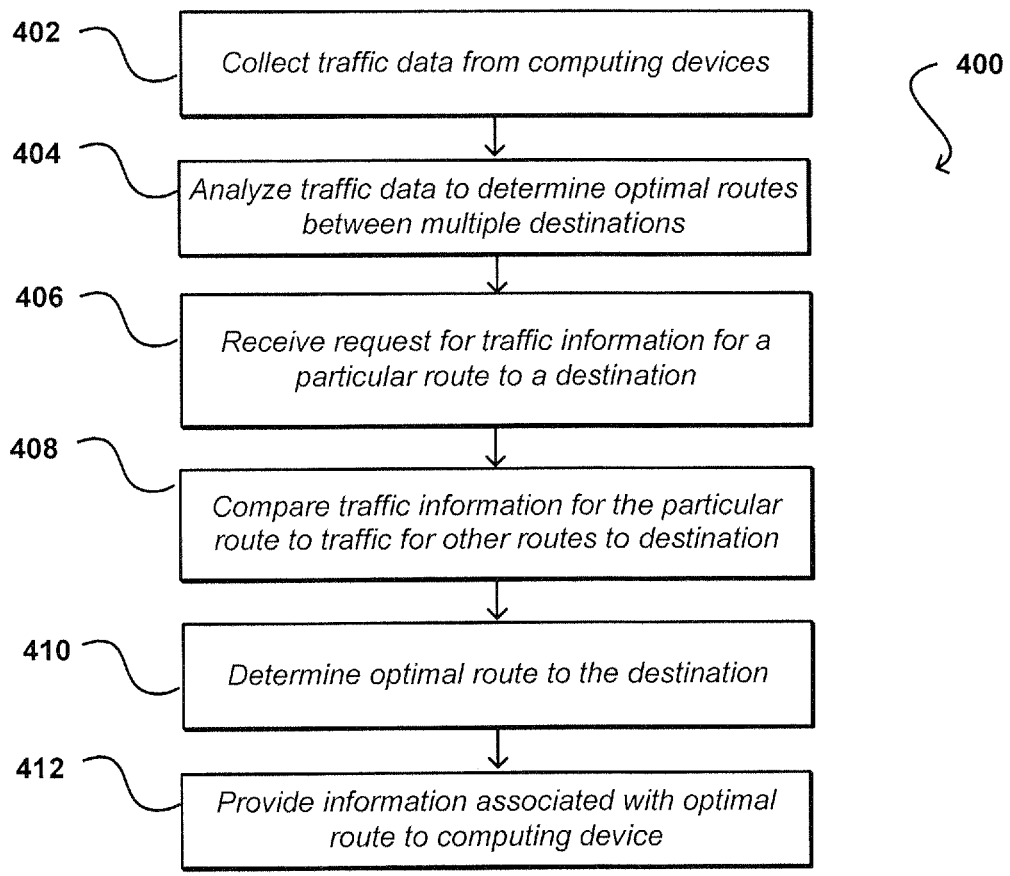
FIG. 4 illustrates an example process for collecting traffic data that can be used in accordance with at least one embodiment.

FIG. 4 illustrates an example process 400 for collecting traffic data to display to a user that can be used in accordance with various embodiments. It should be understood that, for this and other processes discussed herein, there can be additional, fewer, or alternative steps, performed in similar or alternative sequences, or in parallel, within the scope of the various embodiments unless otherwise stated. In this example, traffic data from a plurality of computing devices is collected for a network of roads and highways and aggregated 402. The computing devices can include smartphones, tablet computers, in-car navigation systems, road sensors, and cameras. In this example, the traffic data is analyzed to determine an optimal route between two points within the network of roads and highways 404. In this example, a request for current traffic information associated with a particular route and destination is received 406. In this example, the traffic information for the particular route is compared to traffic information for a plurality of other possible routes to the destination 408. In this example, the optimal route of the plurality of possible routes is determined 410. In this example, the information associated with the optimal route is provided to the computing device 412. Various other types of information can be utilized and provided as well within the scope of the various embodiments.

Figure 5:
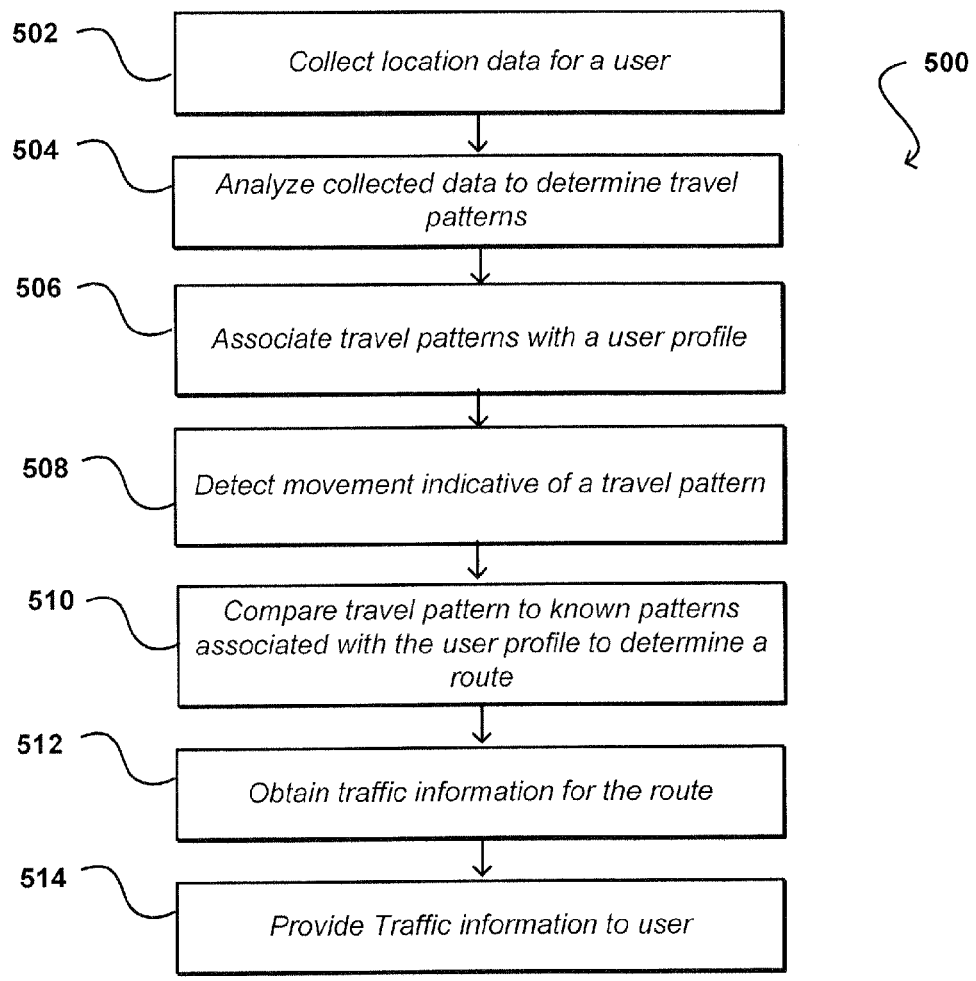
FIG. 5 illustrates an example process for collecting location data that can be used in accordance with at least one embodiment.

FIG. 5 illustrates an example process 500 for collecting traffic data to display to a user that can be used in accordance with various embodiments. It should be understood that, for this and other processes discussed herein, there can be additional, fewer, or alternative steps, performed in similar or alternative sequences, or in parallel, within the scope of the various embodiments unless otherwise stated. In this example, movement of a computing device is monitored and location data associated with the movement of a user while the user is being transported in a vehicle, as determined by at least one motion sensor, is collected 502. The computing device or system in communication therewith can determine a current context of the computing device by determining a time of day, a day of the week, a current location, whether the user is traveling in a vehicle, such as a car, by detecting speeds and accelerations with an accelerometer and GPS sensor, or a combination thereof. In this example, the current context is determined based, at least in part, on the location data corresponding to current movement of the computing device. In this example, the collected location or travel data is analyzed using, for example, a pattern recognition algorithm, to determine navigation or travel patterns of the user 504. In this example, the travel patterns are associated with a user, such as by linking the travel data and patterns to a user account or user profile 506. In this example, movement indicative of a travel pattern is detected or a time associated with a determined user pattern is identified 508. In response, the travel pattern is compared to one or more identified patterns associated with the user profile 510. For example, a route to a destination can be identified based, at least in part, on a comparison between the current context and past travel information or patterns recorded by the computing device. The past travel information is based, at least in part, on location data corresponding to previous movement of the computing device. In response to identifying a matching pattern, the traffic information for a route associated with the matching pattern is obtained 512 and the traffic information is provided to the user 514. Various other types of information can be utilized and provided as well within the scope of the various embodiments.

Figure 6B:
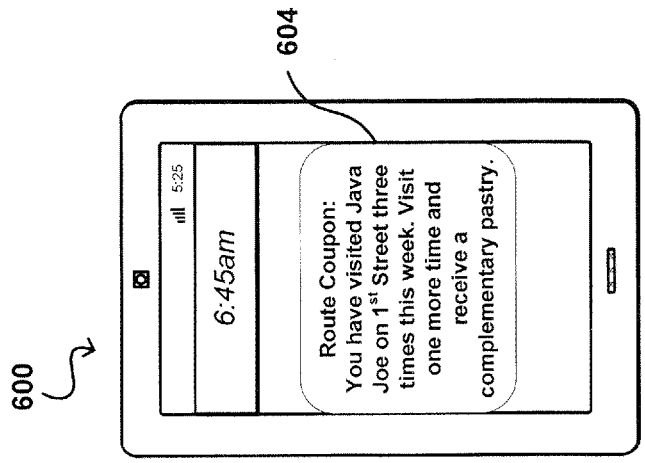
FIGS. 6(a) and 6(b) illustrate example notifications that can be presented to a user in accordance with at least one embodiment.
Figure 6A:
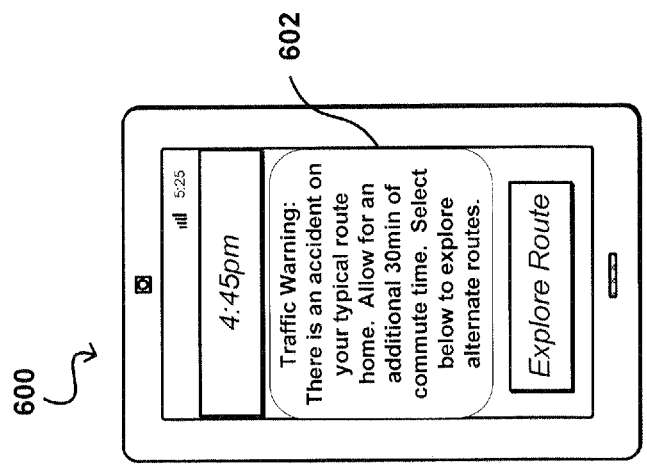

FIGS. 6(a) and 2(b) illustrate two example notifications (602, 604) sent to a user on a computing device 600, in accordance with various embodiments. In FIG. 6(a), based on historical patterns a system has predicted with a fair degree of certainty that a user will leave work around 5:00 pm and checks traffic along the user's normal route home at a predetermined time before to warn the user before leaving in the event there is an issue, such as an accident or road construction, that is causing traffic congestion. In this example, at 4:45 pm, the user receives a traffic warning or notification 602 displayed on a display screen of the computing device 600 that states, "There is an accident on you typical route home. Allow for an additional 30 minutes of commute time." Additionally, the warning states "Select below to explore alternate routes," and a selection area associated with a button image is provided. In this example, the user has been warned before leaving the office of a traffic event and can choose to stay at the office long to wait the event out, or explore an alternate route and potentially be displayed with a relative travel time for each route. The user may also be provided with turn-by-turn navigation directions for a selected route. The notification may also include a map that displays the traffic information graphically. In another example, FIG. 6(b) illustrates a coupon or promotion notification 604. Based on historical patterns the system has identified a pattern of the user leaving the house at 7:00 am and stopping at "Java Joe" on the way to work to presumably grab coffee. In this example, the user is provided with a notification that states, "You have visited Java Joe on 1$^{st}$ Street three times this week—Visit one more time and receive a complimentary pastry." Various other types of information, warnings, and alerts can be utilized and provided as well within the scope of the various embodiments.

While the present disclosure discusses GPS, it should be understood that any type of data relevant to locations, spaced based navigation or otherwise, may be used, and that the data does not necessarily need to be GPS data, which typically comprises geographic coordinates of locations. For example, the data may include addresses or other information identifying places. The data may include additional data that identifies other relevant information also, such as the time of day a user arrived at a particular location and the duration of the user's stay at the location, and the frequency at which the user visits the location. In an embodiment this other relevant information may be calculated using GPS data received or it may be calculated before receipt, such as by the user's portable computing device. The GPS data may be received incrementally as the user travels from place to place, or may be collected by the user and/or another entity and received in a batch process at a scheduled and/or convenient time.

Figures 7A, 7B:
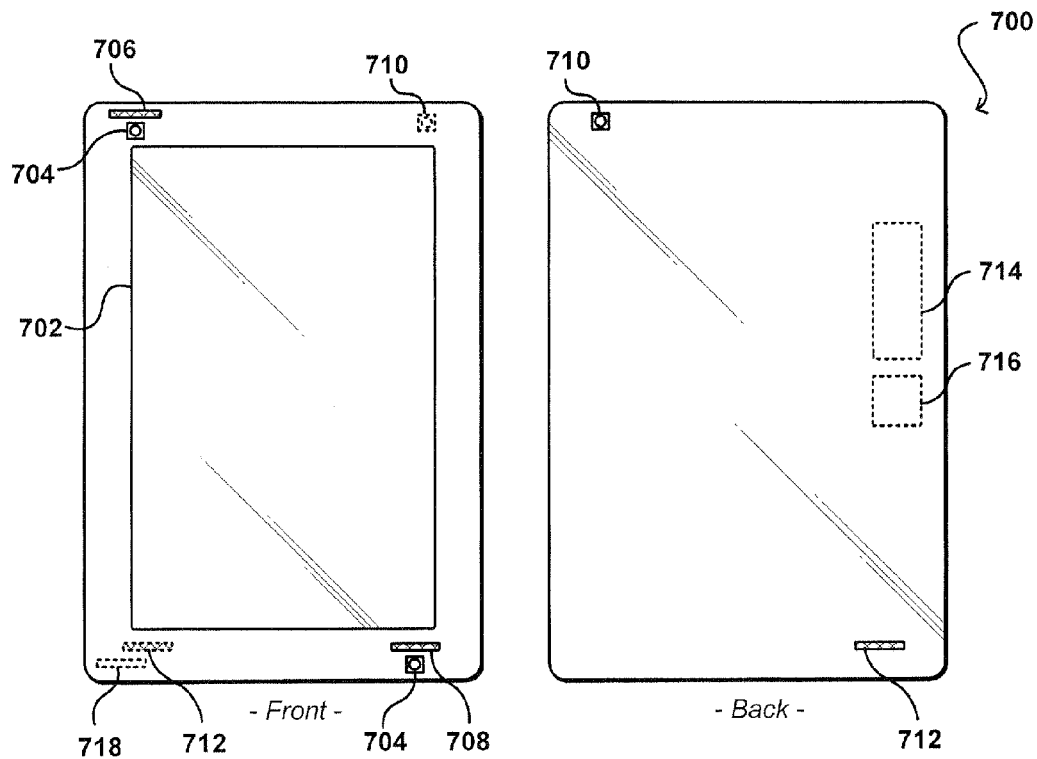
FIGS. 7(a) and 7(b) illustrate an example computing device that can be used to implement aspects of various embodiments.

FIGS. 7(a) and 7(b) illustrate front and back views, respectively, of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
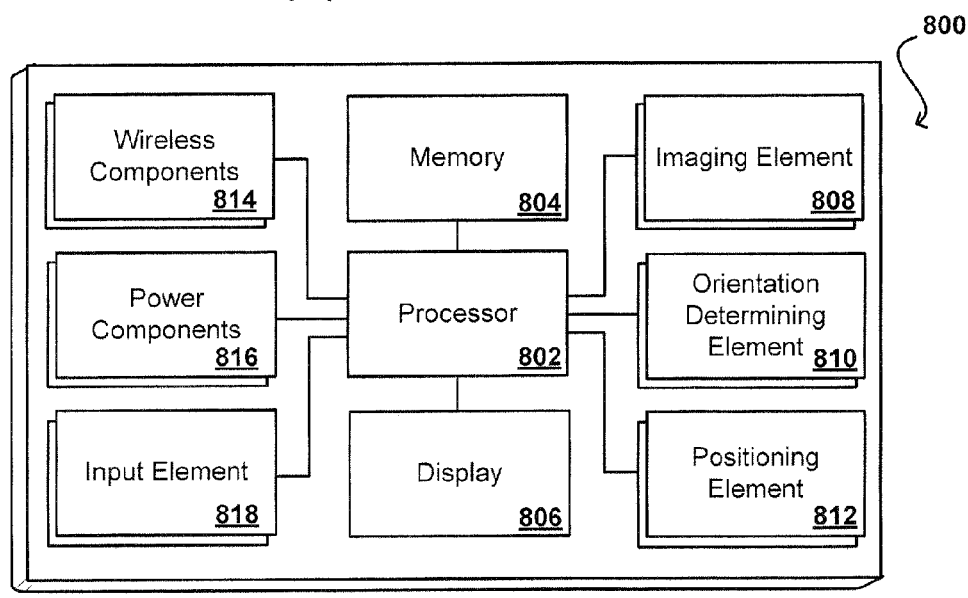
FIG. 8 illustrates example components that can be used with a device such as that illustrated in FIGS. 7(a) and 7(b)

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
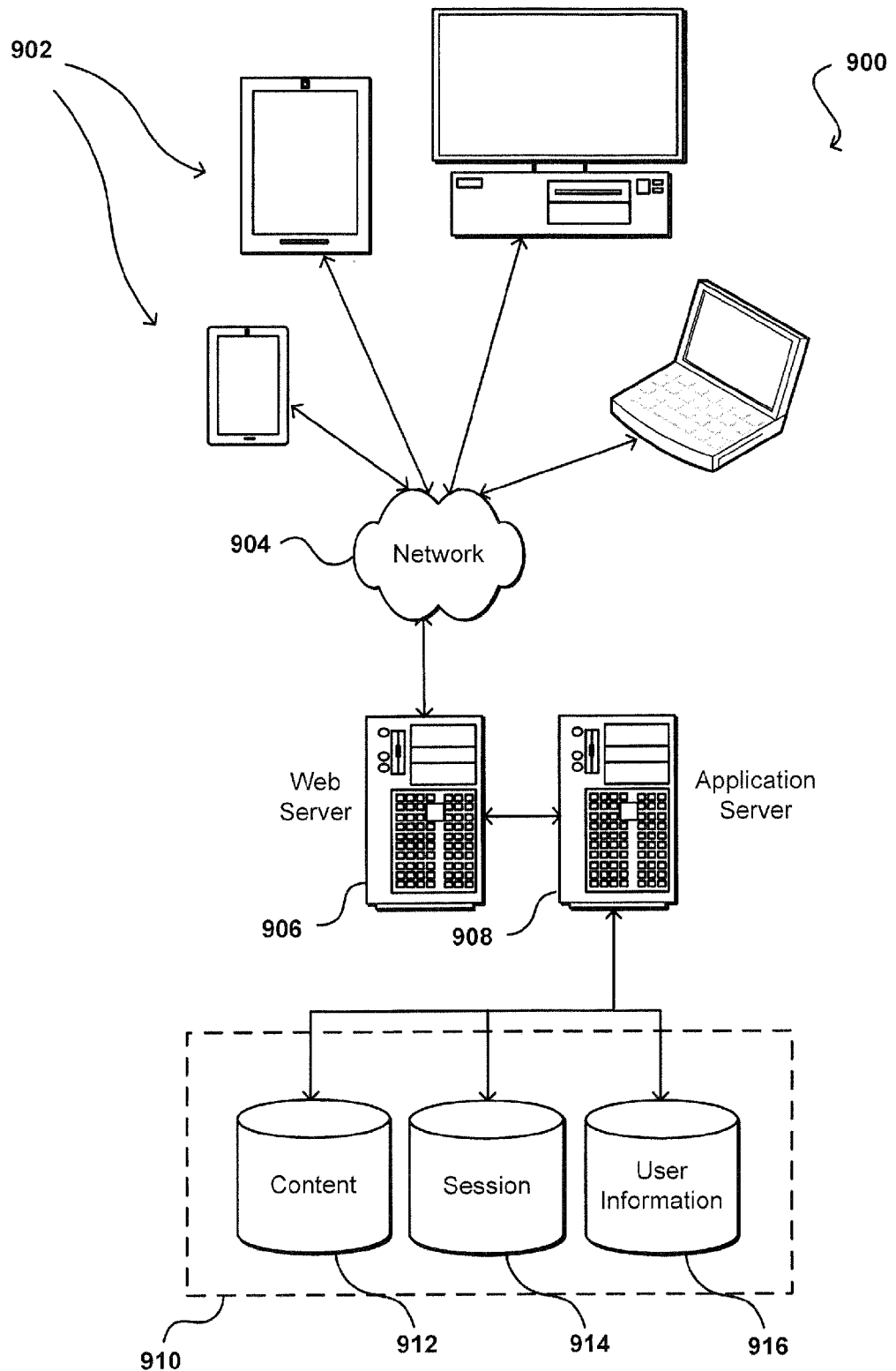
FIG. 9 illustrates another example portion of an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically include computer-readable medium storing instructions that, when executed by a processor of the server, allow the server to perform its intended functions. Suitable implementations for the operating system and general functionality of the servers are known or commercially available and are readily implemented by persons' having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
under the control of one or more computer systems configured with executable instructions,
collecting location data for a user of a computing device based, at least in part, on data provided by at least one sensor of the computing device;
determining one or more travel patterns of the user based at least in part on the collected location data;
associating the one or more travel patterns with a user profile stored in a database;
detecting movement of the computing device;
comparing the movement to the one or more travel patterns associated with the user profile;

identifying a matching route based, at least in part, on the compared movement matching a travel pattern of the one or more travel patterns associated with the user profile;

obtaining, in response to identifying the matching route, traffic information for the identified matching route; and sending the traffic information for the identified matching route to the computing device.

2. The computer-implemented method of claim 1, wherein the travel patterns include information associated with pattern is at least one of a location of the computing device, a day of a week, or a time of day.

3. The computer-implemented method of claim 1, further comprising:

determining traffic congestion along the identified matching route from the traffic information; and sending directions to the user for a second route when the traffic information indicates traffic congestion greater than a threshold amount for the identified matching route.

4. The computer-implemented method of claim 1, wherein the traffic information includes information indicating a second route to a destination associated with the identified matching route.

5. The computer-implemented method of claim 1, wherein the traffic information includes at least one of traffic flow information for the identified matching route or a travel delay time associated with the identified matching route.

6. A computer-implemented method, comprising:

under the control of one or more computer systems configured with executable instructions, determining movement of a computing device;

identifying a route to a destination based, at least in part, on a comparison between the determined movement and past travel information recorded by the computing device;

in response to identifying the route, obtaining traffic information for the identified route; and sending the traffic information to be presented on the computing device.

7. The computer-implemented method of claim 6, further comprising:

collecting location data associated with the movement of the computing device, wherein the past travel information is based, at least in part, on location data corresponding to previous movement of the computing device.

8. The computer-implemented method of claim 6, further comprising:

prompting a user with a list of potential destinations associated with the identified route.

9. The computer-implemented method of claim 6, further comprising:

providing information associated with at least one business located within a predetermined distance of the identified route.

10. The computer-implemented method of claim 9, wherein the information associated with the at least one business includes at least one of directions to the at least one business, a coupon, or product promotion associated with the at least one business.

11. The computer-implemented method of claim 6, wherein the traffic information includes information indicating a second route to the destination.

12. The computer-implemented method of claim 6, wherein traffic information includes at least one of traffic flow information for the route or a travel delay time associated with the route.

13. The computer-implemented method of claim 6, wherein the past travel information is determined based, at least in part, on a historical pattern of prior movement of the computing device.

14. The computer-implemented method of claim 6, wherein the route is associated with a user being transported in a vehicle to the destination at a substantially consistent time of day.

15. The computer-implemented method of claim 6, further comprising:

based at least in part on the traffic information, determining a travel delay time associated with the route to the destination;

determining a second route to the destination; and sending directions to the destination along the second route to be presented on the computing device.

16. A computing system, comprising:

a processor; and memory including instructions that, when executed by the processor, cause the computing system to:

determine movement of a computing device;

identify a route to a destination based, at least in part, on a comparison between the determined movement and past travel information recorded by the computing device;

in response to identifying the route, obtain traffic information for the identified route; and send the traffic information to be presented on the computing device.

17. The computing system of claim 16, wherein the instructions, when executed by the processor, further enable the computing device to:

collect location data associated with prior movement of the computing device to determine the past travel information.

18. The computing system of claim 16, wherein providing the traffic information includes delivering the traffic information to the computing device as a notification for display on a display screen.

19. The computing system of claim 16, wherein the instructions, when executed by the processor, further enable the computing device to:

prompt a user with a list of potential destinations associated with the identified route.

20. A non-transitory computer-readable storage medium storing instructions that, when executed by at least one processor of a computing device, cause the computing device to:

determine movement of a computing device;

identify a route to a destination based, at least in part, on a comparison between the determined movement and past travel information recorded by the computing device;

in response to identifying the route, obtain traffic information for the identified route; and send the traffic information to be presented on the computing device.

21. The non-transitory computer-readable storage medium of claim 20, wherein the route is associated with a user being transported in a vehicle to the destination at a substantially consistent time of day.

22. The non-transitory computer-readable storage medium of claim 20, wherein the destination for the route is determined based at least in part by utilizing information from an address book application of the computing device.

23. The non-transitory computer-readable storage medium of claim 20, wherein the traffic information includes information for an alternate second route to the destination.

24. The non-transitory computer-readable storage medium of claim 20, wherein traffic information includes at least one of traffic flow information for the route or a travel delay time associated with the route.

25. The non-transitory computer-readable storage medium of claim 20, wherein the past travel information is determined based, at least in part, on a historical pattern of prior movement of the computing device.

* * * * *